United States Patent Office 3,465,951
Patented Sept. 9, 1969

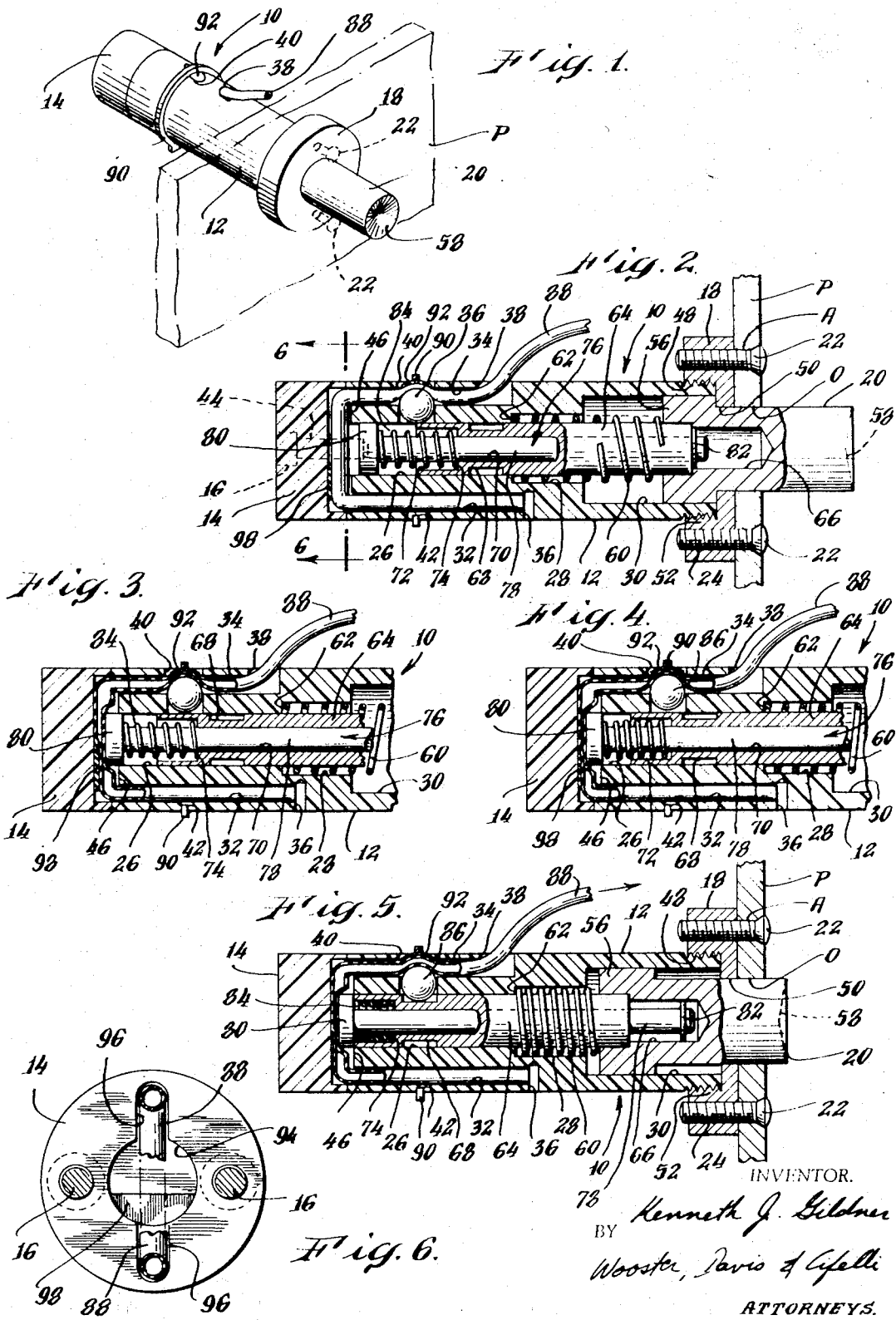

3,465,951
BUBBLE INJECTOR
Kenneth J. Gildner, Bridgeport, Conn., assignor to Picker Chromatography, Inc., Monroe, Conn., a corporation of Delaware
Filed Mar. 8, 1968, Ser. No. 711,563
Int. Cl. F04b 45/00, 39/08
U.S. Cl. 230—160                                                10 Claims

ABSTRACT OF THE DISCLOSURE

An air bubble injector having a body enclosing a portion of a flexible tube normally pinched closed at a point intermediate its ends, one end of which is in communication with the atmosphere and the other with a flowing liquid, and a selectively operable plunger to isolate a section of the enclosed tube between its atmosphere communicating end and the normally pinched portion, to compress the air in that section, and to release the compressed air into the flowing liquid.

BACKGROUND OF THE INVENTION

This invention relates to a bubble injector and more particularly to an apparatus for generating and releasing controlled air bubbles for measuring purposes.

Conventional methods for measuring the flow rate of a liquid include the use of the Venturi meter principle, the transfer of energy from the liquid to the measuring means such as by disposing a paddle wheel in the path of flow, and the introduction of a visible foreign material such as a dye or solid matter into the liquid. The latter method allows the user to directly observe the flowing liquid and to measure the rate of movement of the foreign material. However, under exacting laboratory conditions it is undesirable to change the condition of the liquid by adding a foreign material thereto or to appreciably disturb its flow such as by transferring its energy to a measuring device. Further, it is often desired to measure the flow rate of a liquid moving through an extremely small tube, such as one approaching capillary size, wherein it would be impractical to either insert foreign material into the tube or to reduce the diameter of the tube as required when utilizing the Venturi meter principle.

In one form of liquid chromatography a liquid to be analyzed is passed through an extremely small diameter tube filled with a plurality of minuscule resin coated glass beads. The liquid to be analyzed is propelled through the tube by means of a carrier liquid which is unaffected by the resin while the test liquid is separated into its components due to the varying affinity to the resin of each of the components. The effluent from this tube which comprises the separated components in the carrier liquid is analyzed by means of a suitable scanning apparatus to determine the quantity of each of the known components as each passes the scanner head. It is important when analyzing the effluent to determine the rate of flow thereof. Since the tube through which the liquid moves is extremely small, I have found that the rate of flow may most effectively be visually observed by injecting a minute air bubble into the effluent and timing its passage between spaced index marks inscribed on a visually observable glass tube in the flow path.

SUMMARY OF THE INVENTION

Accordingly, it is the primary object of my invention to provide a simple, foolproof device for generating and releasing a minute bubble of compressed air into a flowing liquid.

Another object of my invention is to provide such a bubble injector device which may be easily mounted upon the control panel of a liquid chromatograph in the form of a simple mechanical device having an actuating push button protruding from the panel which may be depressed to inject an air bubble into the flowing liquid.

To accomplish these objects in one form, I have provided an air bubble injector comprising: a body defining passages therein; a flexible tube partially housed in the body and having one end in communication with the atmosphere and the other end in communication with the flowing liquid; closure means carried by the body for maintaining the tube normally closed at a point intermediate its ends; selectively operable means, located within the body, for sequentially closing the tube at a point between the atmospheric end and the closure means to isolate a portion of the tube and then pinching an area of the tube in the isolated portion; and means for releasing closure means to discharge a compressed air bubble to the flowing liquid.

BRIEF DESCRIPTION OF THE DRAWING

Other objects and further details of that which I believe novel in my invention will be clear from the following description and claims taken with the accompanying drawing wherein:

FIG. 1 is a perspective view of the unique bubble injector of my invention shown as it would be mounted upon the control panel of a measuring instrument;

FIG. 2 is a cross sectional view of the bubble injector constructed in accordance with my invention showing its normal position;

FIG. 3 is a partial sectional view similar to that of FIG. 2 showing state of the device when the push button is initially depressed in the first stage of compression;

FIG. 4 is a partial sectional view similar to that of FIG. 2 showing the second stage of compression;

FIG. 5 is a sectional view similar to that of FIG. 2 showing the relationship of the elements as the compressed air bubble being released; and FIG. 6 is a sectional view taken substantially in the direction of line 6—6 of FIG. 2 showing the end cap construction.

DESCRIPTION OF THE PREFERRED EMBODIMENT

Referring now to the drawing, there is illustrated in FIG. 1 my unique bubble injector referred to generally by the numeral 10 shown mounted on the control panel P (shown in dot-dash lines) of a measuring instrument, for example, a liquid chromatograph. The bubble injector comprises a cylindrical body 12 made of a suitable rigid plastic material which may be machined, an end cap 14 preferably made of the same material as the body 12 and secured thereto by securing screws 16, a mounting collar 18 located at the opposite end of the body 12 and a selectively axially movable pushbutton 20.

The bubble injector 10 is secured to the control panel P on the inside face thereof by means of securing screws 22 which pass through the panel and are threadedly engaged in diametrally opposed tapped openings 24 formed in the mounting collar 18. When properly mounted, the pushbutton 20 passes through the opening O to the front face of the panel P. In order to inject an air bubble into the flowing liquid it is merely necessary for the user to depress the pushbutton 20 thereby sequentially generating and releasing an air bubble as will become apparent hereinafter.

The body 12 comprises a cylindrical member with a stepped central axial bore including a small diameter portion 26 at one end, an intermediate diameter portion 28 adjacent thereto, and a large diameter portion 30 at its opposite end. Diametrally opposed axial bores 32 and 34 straddle the small diameter portion 26 extending from the end of the body to approximately its midpoint. The lower axial bore 32, as viewed in FIG. 2, terminates at a radial pilot hole 36 which communicates the bore to the atmosphere and the upper axial bore 34 terminates directly below an axial slot 38 which extends radially from the outer diameter of the body 12 to the bore 34. A circular aperture 40 is radially formed directly through the upper axial aperture 34 and extends to the small diameter portion 26 of the central axial bore. A circumferential groove 42 formed in the outer diameter of the body intersects the circular aperture 40. At the left end, diametrally opposed axial tapped openings 44 are disposed in the body, lying in a plane normal to the plane in which the axial bores 32 and 34 lie to receive securing screws 16. A radial groove 46 extends outwardly from the central axial bore to each of the axial bores 32 and 34. At the opposite end of the body 12 the outer diameter is threaded at 48 to receive the mounting collar 18.

Mounting collar 18 comprises an annular disc having a central opening 50 and a coaxial counterbore with a threaded wall 52. Diametrically opposed tapped openings 24 are formed through the mounting collar and are positioned to be aligned with apertures A defined in the control panel P for receiving the securing screws 22. The mounting collar 18 is secured to the cylindrical body 12 by the threaded engagement of the wall 52 with the threaded outer diameter 48 of the body.

When mounted on the body the collar retains an enlarged head 56 of the pushbutton 20 within the large diameter portion 30 of the central axial bore. At its opposite end, the pushbutton has a dished surface 58. The small diameter cylindrical portion of the pushbutton is reciprocable in the central opening 50 of the mounting collar 18 and the opening O of the control panel P. A compression spring 60 disposed between the step 62 defined at the interface of the small diameter and intermediate diameter central bore portions 26 and 28 and the left face of pushbutton 20 urges the pushbutton toward the right, out of the body 12.

I have firmly secured a plunger 64 to the pushbutton 20 so that it may reciprocate therewith. This engagement is illustrated as being an interference fit in an axial bore 66 formed in the end of the pushbutton; however, these two members may be threadedly engaged or secured together in any other suitable manner. The plunger comprises a tubular member having an outer diameter slightly smaller than the small diameter central bore portion 26, a wide circumferential groove 68 positioned closer to the left end thereof, an axial bore 70, and a coaxial counterbore 72 at its left end defining a step 74.

An axially movable piston 76 having a shaft 78 and a head 80 is mounted for reciprocation in the axial bore 70 of plunger 64. The shaft is grooved adjacent its right end to receive a snap ring 82 for retaining the piston integral with the plunger. Moreover, a compression spring 84 is positioned between the piston head 80 and the step 74 biasing the plunger in a leftward direction as viewed in FIG. 2.

A ball bearing 86 of slightly smaller diameter than the circular aperture 40 is located therein. A flexible plastic tube 88 is trained through the lower and upper axial bores 32 and 34, one end terminating adjacent the pilot hole 36 and the other end exiting the body 12 through the slot 38, the upper run of the tube passing over the ball bearing 86. Seated in the circumferential groove 42 is a snap ring 90 which is spaced from the upper run of the flexible groove tube 88 so as not to rupture the tube by means of thin, circular protective cap 92 made of Teflon® or a similar material.

The end cap 14 (see FIG. 6) has a cavity formed in one face thereof including a substantially circular portion 94 and radial portions 96 extending therefrom. A pad 98 made of a resilient plastic material is secured to the lower end of the circular cavity portion 94 by means of a suitable adhesive. When the end cap 14 is secured to the body 12 as viewed in FIG. 2, the tube 88 is generally U-shaped, its vertical section being disposed in a radial channel formed by the radial cavity portions 96 and the aligned radial groove 46. One end of the tube communicates with the atmosphere through the radial pilot hole 36 and the other end of the tube extends out of the body 12 and terminates in a suitable coupling (not shown) for delivering the minute bubble of compressed air to the effluent liquid.

The bubble injector 10 is mounted upon the control panel of a suitable measuring instrument as shown. In its normal inoperative condition (illustrated in FIG. 2) the pushbutton 20 is biased toward the right, drawing with it the plunger 64 and piston 76. Ball bearing 86 is urged upwardly by the outer diameter of the plunger pinching and closing off the flexible tube 88 between itself and the protective cap 92 held in place by the snap ring 90. Thus, ambient air enters the pilot hole 36 and fills that portion of the tube 88 between the pilot hole and the ball bearing 86.

When it is desired to inject a bubble of air into the effluent, it is merely necessary to depress the pushbutton 20. As the pushbutton, plunger 64 and piston 76 are moved leftwardly against the vertical portion of the tube 88 the minute air blast is generated and then released. This takes place as follows: First (note FIG. 3), the head 80 of the piston 76 urges the tube 88 against the resilient pad 98 to pinch the tube closed, trapping the air ing that portion of the tube located between the pad and the ball bearing 86. Then (note FIG. 4), the head 80 moves further to the left, flattening the portion of the tube overlying the circular cavity 94 and compressing the trapped air. Finally (note FIG. 5), further depression of the pushbutton 20 maintains the piston head 80 against the tube 88 while moving the plunger 64 relative to the piston against the bias of the compression spring 84. At the end of its stroke, the wide circumferential groove 68 underlies the ball bearing 86 which drops therein allowing the tube to open and the compressed air to escape therethrough to the effluent. When the pushbutton 20 is released the compression spring 84 urges the plunger rightwardly to the FIG. 4 condition to raise the ball bearing and once again to seal the outflow end of the tube and then the piston moves rightwardly to release the pinched portion of the tube. Since one end of the tube is always in communication with the atmosphere ambient air immediately flows into the tube and another bubble may again be injected in a similar manner.

While the foregoing description has been primarily directed to a device for injecting bubbles of air into a flowing fluid, the invention is not so limited. Under certain circumstances, for example, it may be desired to inject bubbles of other gases and, of course, the scope of the invention is in no way limited by the condition of the fluid which receives the bubbles. When gases other than air are to be injected, the inlet end of the flexible tube may be connected directly to a suitable source of such gas. It should be understood that the present disclosure has been made only by way of example and that numerous changes in details of construction and the combination and arrangement of parts may be resorted to without departing from the true spirit and scope of the invention as hereinafter claimed.

What is claimed is:

1. A bubble injector comprising: a body defining passages therein; a flexible tube disposed partially within said body, one end of said tube being open to a suitable gas supply and the other end being a delivery end; closure means carried by said body for maintaining said tube normally closed at a point intermediate its ends; selectively operable means positioned within said body for sequentially closing said tube at a point between said one end and said closure means to isolate a portion of said tube and then pinching an area of said tube in said isolated portion to compress the gas in said portion; and means positioned within said body for releasing said closure means to discharge said compressed gas to said delivery end.

2. The bubble injector defined in claim 1 wherein said closure means includes a ring encircling said body and a relatively movable internal member normally urged against said ring, and wherein said flexible tube is positioned between said ring and said internal member.

3. The bubble injector defined in claim 2 wherein said means for releasing said closure means includes an axially movable member having a seat formed therein to receive said internal member in one position of said axially movable member, and said internal member is radially biased so that it may enter said seat when aligned therewith, thereby releasing said flexible tube.

4. The bubble injector defined in claim 1 wherein said selectively operable means includes a pushbutton carried by said body and movable relative thereto and being normally biased outwardly of said body.

5. The bubble injector defined in claim 1 wherein said passages include a central axial bore receiving said selectively operable means, a smaller diameter axial bore adjacent said central axial bore receiving a part of said flexible tube, a radial bore defined in said body and intersecting said smaller diameter bore and said central axial bore, and an opening through which the delivery end of said flexible tube may exit said body.

6. The bubble injector defined in claim 1 wherein: a portion of said flexible tube lies adjacent one end of said body; an end cap is secured to said one end of said body; and a resilient pad is carried by said end cap.

7. The bubble injector defined in claim 6 wherein said selectively operable means includes a piston reciprocable with said body having a head movable toward said end cap whereby initial movement of said head toward said end cap pinches a small area of said flexible tube and further movement of said head pinches a larger area of said flexible tube.

8. The bubble injector defined in claim 7 wherein said internal member comprises a ball bearing.

9. The bubble injector defined in claim 1 wherein: said closure means includes a ring encircling said body and a relatively movable ball bearing normally urged against said ring; said flexible tube is positioned within said body between said ring and said internal member and adjacent one end of said body; an end cap is secured to said one end of said body and carries a resilient pad; said selectively operable means includes a pushbutton movable relative to said body and a piston reciprocable within said body having a head movable toward said end cap; and said means for releasing said closure means includes an axially movable plunger movable with said piston and having a seat formed thereon to receive said ball bearing when said ball bearing is aligned with said seat, whereby initial movement of said pushbutton moves said piston head and plunger toward said end cap and pinches a small area of said flexible tube, further advancement of said pushbutton brings the piston head to rest, pinching a larger area of said flexible tube, and still further advancement of said pushbutton aligns said seat of said plunger with said ball bearing to release said flexible tube.

10. The bubble injector defined in claim 9 wherein said passages include: a central axial bore receiving said piston, said plunger, and a portion of said pushbutton; a pair of small diameter axial bores straddling said central axial bore receiving portion of said flexible tube; a first radial opening communicating one of said small diameter axial bores with the atmosphere; a second radial opening communicating the other of said small diameter axial bores with the atmosphere through which the delivery end of said flexible tube exits said body; and a radial opening intersecting said other small diameter axial bore and said central axial bore, receiving said ball bearing.

References Cited

UNITED STATES PATENTS 2,685,987    8/1954    Kaiser    222—383 XR
3,142,299    7/1964    Henderson    222—383 XR ROBERT M. WALKER, Primary Examiner U.S. Cl. X.R.

230—222